United States Patent
Pearce

(10) Patent No.: US 6,622,419 B2
(45) Date of Patent: Sep. 23, 2003

(54) MECHANICAL FISHING LURE

(76) Inventor: Frank Gerald Pearce, 301 S. Sherman St. #204, Richardson, TX (US) 75081

( * ) Notice: Subject to any disclaimer, the term of this patent is extended or adjusted under 35 U.S.C. 154(b) by 0 days.

(21) Appl. No.: 09/782,103

(22) Filed: Feb. 12, 2001

(65) Prior Publication Data

US 2002/0108292 A1 Aug. 15, 2002

(51) Int. Cl.[7] ............................................... A01K 85/00
(52) U.S. Cl. ........................................ 43/26.2; 43/42.28
(58) Field of Search ....................... 43/26.2, 2, 3, 42.36, 43/42.08

(56) References Cited

U.S. PATENT DOCUMENTS

| | | | |
|---|---|---|---|
| 891,037 A | | 6/1908 | Caldwell |
| 1,758,160 A | | 5/1930 | Lee |
| 2,387,255 A | * | 10/1945 | Godlewski ................ 43/42.06 |
| 2,523,536 A | * | 9/1950 | Maddux .................... 43/42.03 |
| 2,875,549 A | * | 3/1959 | O'Sullivan ................ 43/42.22 |
| 3,007,276 A | | 11/1961 | Lidert |
| 4,674,223 A | | 6/1987 | Pearce |
| 4,831,767 A | | 5/1989 | Pearce |
| 4,832,650 A | * | 5/1989 | Tong ........................... 43/26.2 |
| 5,035,075 A | | 7/1991 | Pearce |
| 5,428,916 A | * | 7/1995 | Dubriske .................... 43/19.2 |
| 5,694,714 A | * | 12/1997 | Basso et al. ................ 43/26.2 |
| 5,749,214 A | * | 5/1998 | Cook ....................... 264/290.5 |
| 5,881,492 A | * | 3/1999 | Abiru et al. .............. 43/44.98 |
| 5,956,887 A | * | 9/1999 | Mostovsky ................ 43/42.19 |
| 6,050,022 A | * | 4/2000 | Brick ......................... 43/26.2 |

* cited by examiner

Primary Examiner—Peter M. Poon
Assistant Examiner—Susan Piascik

(57) ABSTRACT

A fishing lure for game fish angling has a body structure with hooks attached thereto. The lure contains a gear box with a coil spring for storing the energy of an angler's arm motion during the lure retrieve, and a gear train for transferring the stored energy to an external appendage. A metal shaft extends through the gear box and is attached to a spool and line arrangement for winding the coil spring. The lure can be repeatedly and selectively activated by the angler to impart a sustained oscillating motion to the external appendage. A rustproof metal cam pin and a resin impregnated low stretch line provide improved durability. The lure may be fitted with a translucent concave mouth to resist forward movement while providing the necessary water resistance to wind the coil spring.

5 Claims, 6 Drawing Sheets

MECHANICAL FISHING LURE

TECHNICAL FIELD

The present invention relates generally to fishing lures, and more particularly to a fishing lure having a line activated coil spring gearbox mounted within the body of the lure for driving lure body appendages projecting therefrom.

BACKGROUND ART

Attempts to produce a reliable mechanically animated fishing lure date back for more than a century. Fishermen have long known that game fish are attracted to sound and motion in selecting their prey. Scientific tests recently have confirmed this and have shown further that larger game select injured or weakened prey that are relatively immobile rather than risk the loss of energy in chasing active, elusive prey. Thus, a lure that can produce the sound and motion of injured prey while remaining in a localized area or strike zone, provides great benefits to the game fish angler. In order to produce the desired sound and motion, non-mechanical lures require continuous water flow over their surfaces which necessitates the angler to move the lure through body of water and away from the intended target or strike zone. Mechanical lures, however, on account of their ability to translate the motion of the fisherman's arm to an energy storage mechanism, and then to the lure's appendages, are able to repetitively produce sound and motion while remaining in the strike zone for extended periods of time, thus improving the chance of a fish, and in particular, a large fish, taking the lure.

Prior attempts to produce a successful mechanical fishing lure have included attempts to store energy in elastic bands, such as in U.S. Pat. No. 1,758,160 to A. L. Lee, and by a hand wound spring motor, such as in U.S. Pat. No. 891,037 to C.D. Caldwell. These attempts failed to provide reliability, ease of reproduction, and were overly complex. Significant improvements in spring driven mechanical lure technology were achieved in recent embodiments such as in U.S. Pat. Nos. 4,674,223, 4,831,767, and 5,035,075 to F. G. Pearce, in which a spring equipped gearbox is driven by a winding spool for increased reliability and realism. As important as these latter advancements are, additional improvements have been found to be necessary in order to produce a realistic spring powered mechanical lure that can withstand the high stress encountered in game fish angling.

The improvements as articulated herein have overcome the limitations of the previously described attempts and have resulted in a mechanical lure that is both durable and reliable under the stress of actual fishing conditions, and which, in particular embodiments, can be configured to a near mirror image of game fish prey.

DISCLOSURE OF THE INVENTION

With the limitations of the previous devices in mind, the present invention provides an improved spring powered mechanical fishing lure that overcomes the deficiencies recited above. In recently improved embodiments, mechanical lures have relied upon a plastic disk or cam that is press-fitted to a plastic shaft extending from the lure's gearbox to drive the lure appendages. It has been found that, under actual fishing conditions, this cam receives high lateral loading and often separates from the gearbox shaft, resulting in lure failure. Several attempts have been made to overcome this deficiency, including the application of glue to the cam and shaft as well as surface roughening to improve the connection between the cam and shaft. Yet, such attempts have failed to adequately provide the reliability necessary for a successful mechanical lure. Thus, in accordance with one embodiment of the present invention, a singular metal pin, comprised of rustproof material such as stainless steel, is configured with a duality of approximate right angle bends to replace the plastic shaft and cam of the previous devices, thus providing an improved connection between the gearbox and the lure appendages.

Recently improved embodiments of mechanical lures have further employed a spool and line means to wind the lure's coil spring. This arrangement utilizes a line segment that is routed through a small aperture in the lure wall and into the interior of the lure where it is attached to the winding spool. A swivel is then fitted to the line to prevent the line from retracting into the lure and to provide a connection for the main fishing line. It has been found that the aperture for entry of the line into the lure is best provided for if its diameter is substantially the same as that of the line, thus preventing debris from being pulled into the lure during line retraction and fouling the mechanism. It has also been found that the function of the spool and line means is best achieved through the use of a multi-filament braided line which provides durability as well as the pliability necessary for smooth and accurate wrapping of the line around the spool during winding and unwinding of the coil spring. Yet, successful operation has yet to be fully achieved since braided line, because of its large diameter and multi-filament composition, is easily penetrated by the lure's hooks or damaged by sharp objects in the fishing environment. This, in turn, causes fraying which weakens the line and further expands its diameter thus preventing the line from fully retracting into the lure aperture during spool take-up. Thus, in accordance with a further embodiment of the present invention, the line and spool means are optimized by the use of a braided line comprised of aramid or high modulus polyethylene fibers which are impregnated with a suitable resin to compact the fibers, thus providing a small diameter, high strength line that resists fraying, hook penetration, and sharp object damage.

Recent mechanical lure embodiments have employed a concave face to provide the water resistance necessary to translate the fisherman's arm motion to the lure's coil spring. Since many traditional, non-mechanical lures have also employed a concave face to provide water disturbance to attract game fish, such designs readily lend themselves to mechanical lure configurations. However, in attempts to achieve a mechanical lure that imitates creatures that comprise game fish prey such as minnows and frogs, the employment of a concave face detracts from the desired goal of achieving a lifelike appearance. Thus, a further embodiment of the present invention comprises a lure body that is configured to imitate a live minnow, frog, or other game fish prey, and to which a concave mouth is mounted to the front of the lure body to provide the required water resistance to wind the lure's coil spring. The concave mouth is further comprised of translucent plastic to disguise its presence, has a circular aperture and channel through which the line is threaded to the winding spool, and employs a tongue at its distal end to interlock with the lure housing during assembly.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION

Figure 1:
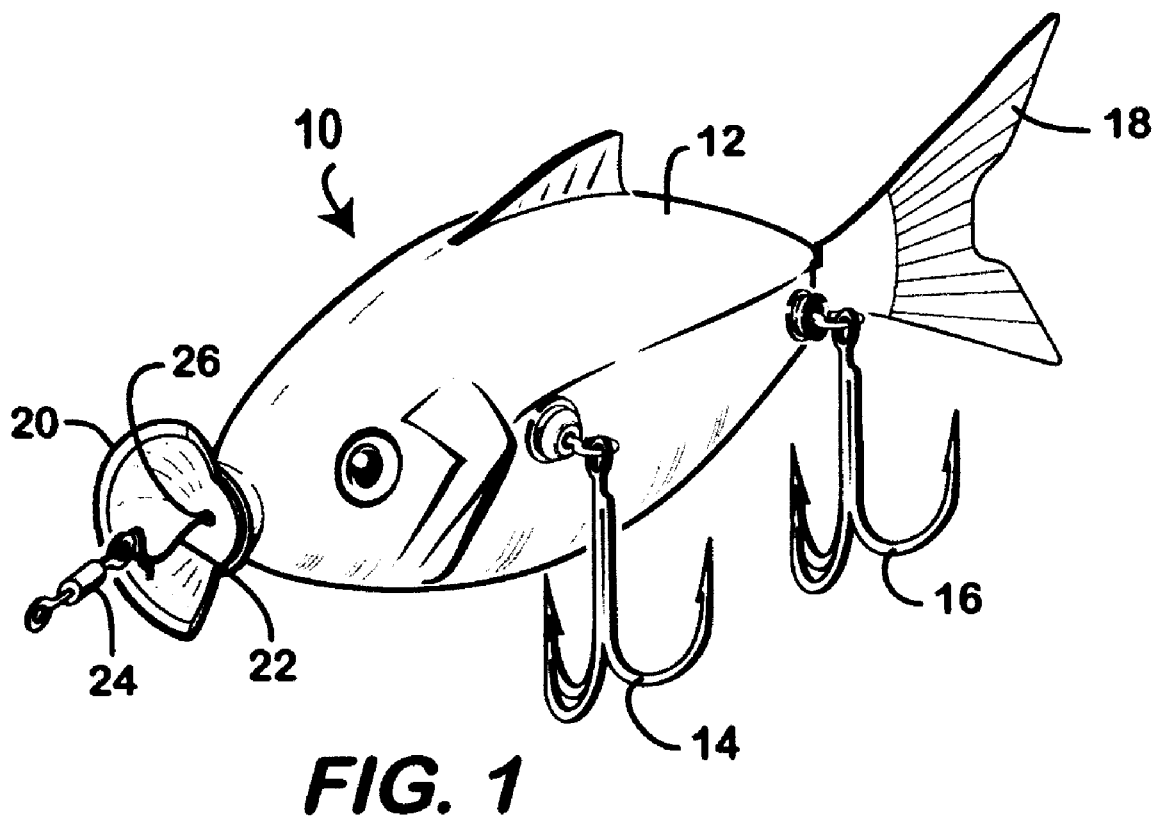
FIG. 1 is a perspective view of one embodiment of the lure of the present invention.

Referring to the drawings, and specifically FIG. 1, the present invention is an artificial game fish lure 10 having a main body portion 12 with one or more fishing hooks 14 and 16 attached thereto. In the embodiment illustrated in FIG. 1, the lure is a simulation of a bait fish and is equipped with a tail fin 18 and concave mouth section 20 through which line 22, fitted with swivel 24, is threaded through aperture 26.

Figure 2:
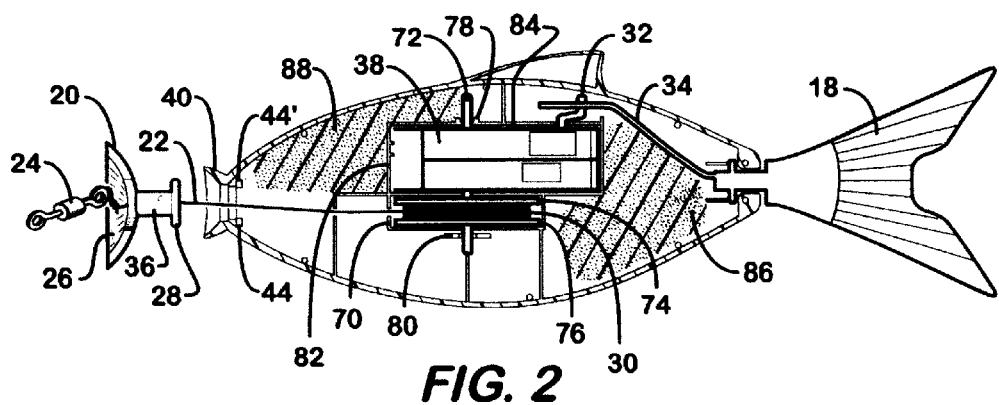
FIG. 2 is a vertical view showing the internal structure of the present invention.

Referring to FIG. 2, line 22 is routed through mouth extension 36 to line guide 70 where it is attached to and wrapped around spool 30, which is press fit to shaft 72 of gearbox 38. Spool 30 is equipped with upper and lower lip 74 and 76 respectively to facilitate retention of line 22 on spool 30 during winding and unwinding. Gearbox 38 is fitted with a shrink wrap covering 84 and is housed in cavity 82 to form a water tight seal. Apertures 78 and 80 receive the upper and lower ends, respectively, of shaft 72 to further secure gearbox 38 in lure body 12. Collar 40 provides support for concave mouth section 20. Body projections 44 and 44' abut against rectangular tongue section 28 to further secure mouth section 20. Styrofoam inserts 86 and 88 provide floatation to keep the lure body partially above water during use.

Figure 3:
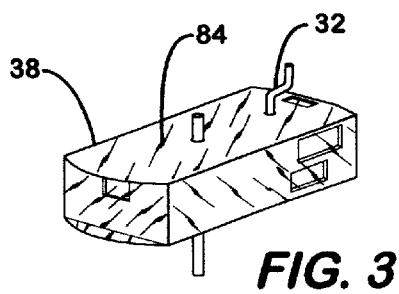
FIG. 3 is a perspective view of the lure gearbox and improved drive cam means of the present invention.

Referring now to FIG. 3, the gearbox 38 is shown with shrink wrap seal 84 and metal pin 32 which forms the improved cam means.

Figure 4:
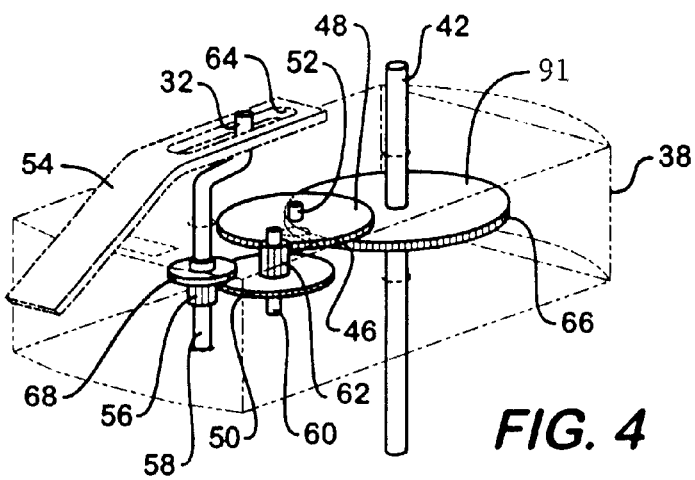
FIG. 4 is an enlarged perspective view of the lure gearbox showing the relationship of the gears to the improved cam means.
Figure 5:
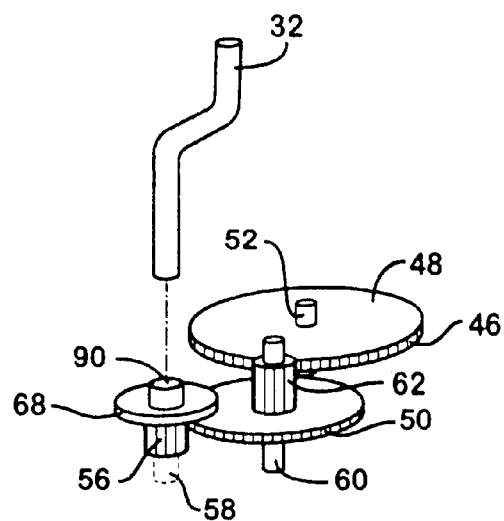
FIG. 5 is an exploded view showing the improved cam means of the present invention.

FIGS. 4 and 5 show the interior gears of gearbox 38 for the embodiment shown in FIG. 1. Gear 91 is attached to and rotates with gear shaft 42. Gear 91 is indexed with gear 46 which rotates with and is positioned by shaft 52. A larger gear 48 is attached to gear 46 and is indexed with gear 62 which rotates on integral shaft 60. In this embodiment, an enlarged gear 50 is formed integrally with gear 62 and is indexed with gear 56, gear 56 having integral disk 68 at one end. Metal pin 32 is press fit into bore 90 in disk 68 and gear 56 and forms rotation shaft 58. Metal pin 32 forms the cam, which drives the lure appendage.

Figure 6:
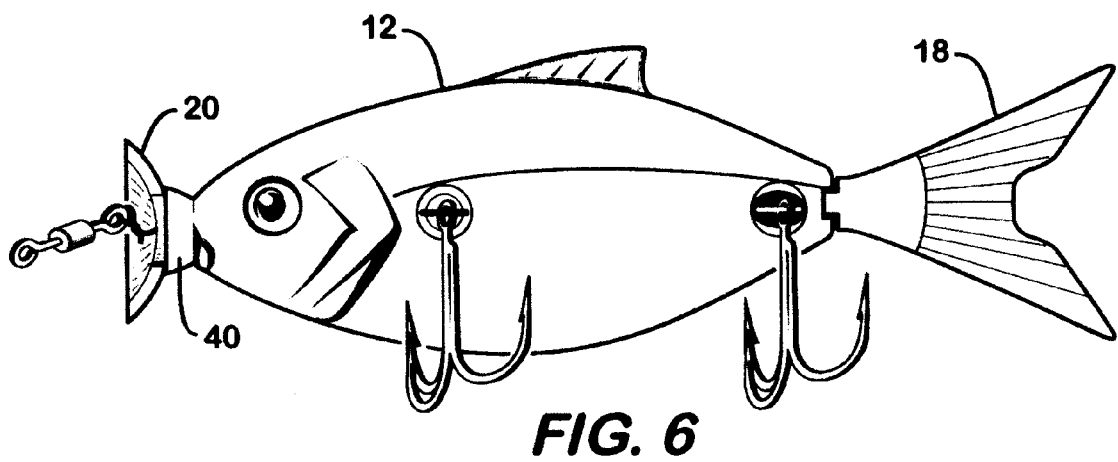
FIG. 6 is a vertical view showing the concave mouth section mounted to the lure body in one embodiment of the present invention.
Figure 7:
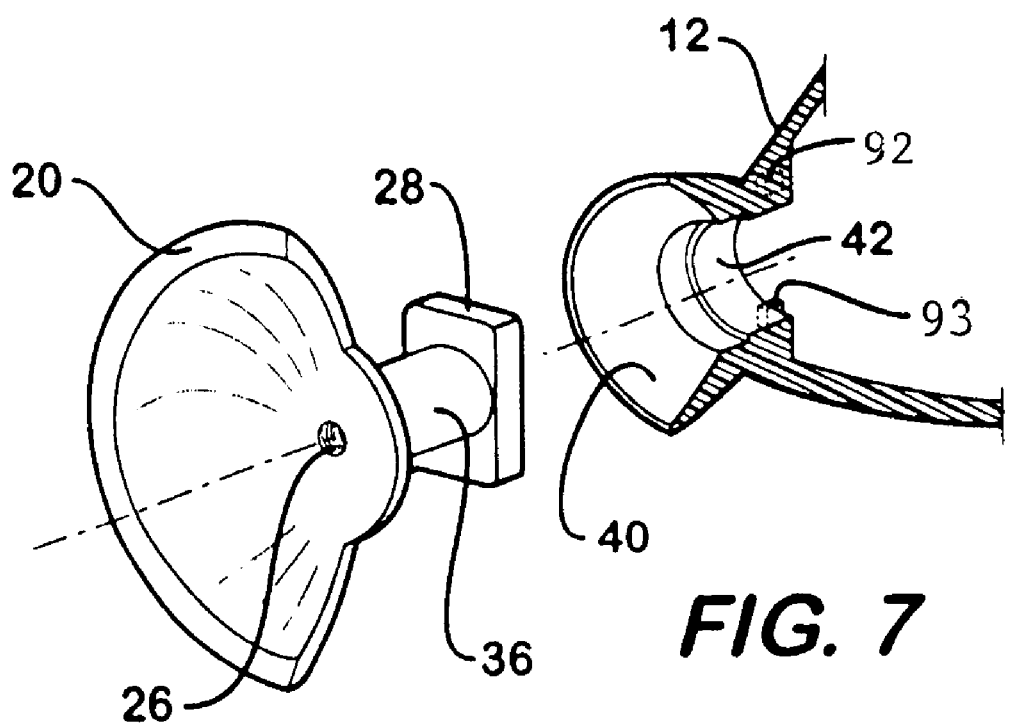
FIG. 7 is an enlarged view of FIG. 6 showing the interlocking relationship between the concave mouth section and the lure body housing.

FIG. 6 illustrates concave mouth section 20 fully integrated into the assembled lure of the embodiment of FIG. 1. In this illustration, mouth section 20 is mounted in lure body 12 and is abutted against collar 40 for support and stabilization. FIG. 7 shows the interlocking relationship of mouth section 20 and lure body 12, in which projection 36 and integral rectangular tongue 28 are received by grooves 42 and 44 respectively, of the anterior portion of lure body 12.

Body projections 44 and 44' form stops to fix and prevent rotation of mouth section 20. In this embodiment, mouth section 20 forms a half moon shape, which, during use, is oriented skyward, thus providing the necessary resistance for winding the lure's coil spring while preventing the lure from diving during activation.

Figure 8:
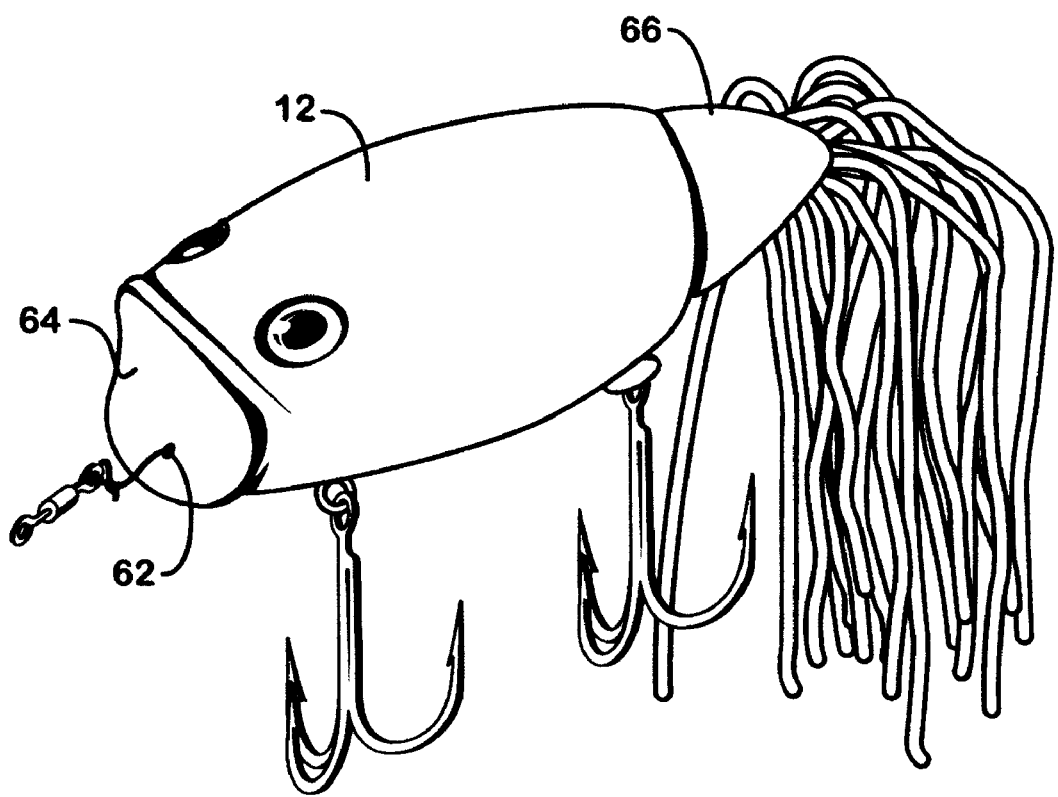
FIG. 8 is a perspective view of an alternative embodiment of the present invention.

FIG. 8 shows an alternative embodiment of the present invention that utilizes an integral concave mouth for water resistance and in which the improvements of a metal cam means and improved line have been incorporated.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the spirit and scope of the invention.

I claim:

1. A fishing lure for use in a body of water having a lure body with hooks attached thereto for game fish angling comprising:

a coil spring energy storage mechanism housed within said lure body and having a windup spool attached thereto;

a line connected to said windup spool and extending from said lure body, said coil spring energy mechanism being operable by engagement with said line, wherein said line is comprised of fibers selected from a group consisting of aramid and high modulus polyethylene fibers, and said line is impregnated with a resin for resisting fraying and penetration of said line by said hooks;

a concave mouth section, said concave mouth section comprising an aperture, said line extends outwardly from the front of said lure body and through said concave mouth section and is attached to a line connection means;

an appendage extending externally from said lure body for movement about a substantially horizontal axis upon operation of said coil spring energy mechanism;

a gear drive train driven by said coil spring energy mechanism, said drive train including a drive gear having an appropriate bore for receiving a metal cam press fitted into said drive gear for driving said appendage, said metal cam having a pin disposed exterior to said drive gear having two substantially orthogonal bights along its axis to provide a terminal shaft for driving said appendage;

flotation means positioned in said lure body for maintaining at least a portion of said lure body above said body of water;

whereby during operation tension is applied to said line thereby unwinding said spool and activating said coil spring energy storage mechanism; said coil spring energy storage mechanism rotates said gear train which in turn oscillates said appendage.

2. The fishing lure according to claim 1 wherein said concave mouth comprises an elongate projection and a rectangular tongue; said projection and said tongue are matingly received by a front collar portion of said lure body.

3. A fishing lure for use in a body of water having a lure body with hooks attached thereto for game fish angling comprising:

a coil spring energy storage mechanism housed within said lure body and having a windup spool attached thereto;

a line connected to said windup spool and extending from said lure body, said coil spring energy mechanism being operable by engagement with said line;

a concave mouth section, said concave mouth section comprising an aperture, said line extends outwardly from the front of said lure body and through said concave mouth section and is attached to a line connection means;

an appendage extending externally from said lure body for movement about a substantially horizontal axis upon operation of said coil spring energy mechanism;

a gear drive train driven by said coil spring energy mechanism, said drive train including a drive gear having an appropriate bore for receiving a metal cam press fitted into said drive gear for driving said appendage, said metal cam having a pin disposed exterior to said drive gear having two substantially orthogonal bights along its axis to provide a terminal shaft for driving said appendage;

flotation means positioned in said lure body for maintaining at least a portion of said lure body above said body of water;

whereby during operation tension is applied to said line thereby unwinding said spool and activating said coil spring energy storage mechanism; said coil spring energy storage mechanism rotates said gear train which in turn oscillates said appendage.

4. The fishing lure according to claim 3 wherein said line is comprised of fibers selected from a group consisting of aramid and high modulus polyethylene fibers, and wherein said line is impregnated with a resin for resisting fraying and penetration of said line by said hooks.

5. The fishing lure according to claim 3 wherein said concave mouth comprises an elongate projection and a rectangular tongue; said projection and said tongue are matingly received by a front collar portion of said lure body.

* * * * *